United States Patent
Liu et al.

(10) Patent No.: US 10,455,448 B2
(45) Date of Patent: Oct. 22, 2019

(54) RANDOM ACCESS SIGNALLING RESENDING METHOD AND APPARATUS

(71) Applicant: ZTE Corporation, Shenzhen (CN)

(72) Inventors: Kun Liu, Shenzhen (CN); Bo Dai, Shenzhen (CN); Zhaohua Lu, Shenzhen (CN); Shuqiang Xia, Shenzhen (CN); Xianming Chen, Shenzhen (CN); Jing Shi, Shenzhen (CN); Wen Zhang, Shenzhen (CN); Huiying Fang, Shenzhen (CN)

(73) Assignee: ZTE CORPORATION (CN)

( * ) Notice: Subject to any disclaimer, the term of this patent is extended or adjusted under 35 U.S.C. 154(b) by 5 days.

(21) Appl. No.: 15/563,609

(22) PCT Filed: Sep. 16, 2015

(86) PCT No.: PCT/CN2015/089806
§ 371 (c)(1),
(2) Date: Nov. 16, 2017

(87) PCT Pub. No.: WO2016/161773
PCT Pub. Date: Oct. 13, 2016

(65) Prior Publication Data
US 2018/0084455 A1   Mar. 22, 2018

(30) Foreign Application Priority Data
Apr. 10, 2015   (CN) .......................... 2015 1 0170360

(51) Int. Cl.
*H04W 4/00* (2018.01)
*H04W 28/04* (2009.01)
(Continued)

(52) U.S. Cl.
CPC ............. *H04W 28/04* (2013.01); *H04W 4/70* (2018.02); *H04W 74/08* (2013.01); *H04W 74/0833* (2013.01)

(58) Field of Classification Search
CPC ....... H04W 28/04; H04W 4/70; H04W 74/08; H04W 74/0833
See application file for complete search history.

(56) References Cited

U.S. PATENT DOCUMENTS

| 2011/0244907 A1 | 10/2011 | Golaup | |
| 2013/0095767 A1* | 4/2013 | Tajima | G08C 17/00 455/68 |

(Continued)

FOREIGN PATENT DOCUMENTS

| CN | 101651892 A | 2/2010 |
| CN | 102668683 A | 9/2012 |

(Continued)

OTHER PUBLICATIONS

International Search Report in international application No. PCT/CN2015/089806, dated Dec. 29, 2015.

(Continued)

*Primary Examiner* — Abdelnabi O Musa
(74) *Attorney, Agent, or Firm* — McDonald Hopkins LLC

(57) ABSTRACT

Provided are a random access signalling resending method and apparatus. In the method, in the case where a first condition is satisfied, a second-type node is adopted to resend random access signalling Msg1, thereby solving the problem that the access quality of a user terminal accessing an LTE/LTE-A system is not high and improving the access quality of the user terminal accessing the LTE/LTE-A system.

9 Claims, 2 Drawing Sheets

(51) Int. Cl.
*H04W 74/08* (2009.01)
*H04W 4/70* (2018.01)

(56) References Cited

U.S. PATENT DOCUMENTS

| | | | | |
|---|---|---|---|---|
| 2014/0010172 | A1* | 1/2014 | Wei | H04W 76/14 370/329 |
| 2015/0312892 | A1 | 10/2015 | Liu | |
| 2016/0219622 | A1 | 7/2016 | Liu et al. | |

FOREIGN PATENT DOCUMENTS

| | | |
|---|---|---|
| CN | 102917433 A | 2/2013 |
| CN | 102934469 A | 2/2013 |
| CN | 103379656 A | 10/2013 |
| CN | 102668683 B | 7/2014 |
| GB | 2472362 A | 2/2011 |
| WO | 2014082253 A1 | 6/2014 |
| WO | 2014177092 A1 | 11/2014 |

OTHER PUBLICATIONS

English Translation of the Written Opinion of the International Search Authority in international application No. PCT/CN2015/089806, dated Dec. 29, 2015.
Research on random access process in LTE system, mailed in 2011.
Coverage distance analysis of TD LTE system, mailed in 2011.
Supplementary European Search Report in European application No. 15888325.6, dated Mar. 14, 2018.
Mediatek Inc: Clarification on preamble retransmission ,3GPP Draft; R2-131866 Disc Clarification on Preamble Retransmission, 3rd Generation Partnership Project (3GPP), Mobile Competence Centre ; 650, Route Des Lucioles ; F-06921 Sophia-Antipolis Cedex; FR vol. RAN WG2, No. Fukuoka, Japan; May 20, 2013-May 24, 2013 May 10, 2013 (May 10, 2013), XP050699902, Retrieved from the Internet:URL:http://www.3gpp.org/ftp/tsg ran/WG2 RL2/TSGR2 82/Docs/.

* cited by examiner

S102 — Whether a first condition is met or not is detected, the first condition including at least one of that: a second-type node fails to successfully decode an RAR Msg2; the second-type node successfully decodes the RAR Msg2, and there is no RAR information, which is intended to be sent to the second-type node, in the decoded RAR Msg2; a first-type node fails to successfully decode a Msg3; the first-type node successfully decodes the Msg3, and sends a Msg4 to the second-type node, and the second-type node fails to successfully decode the Msg4; and the first-type node successfully decodes the Msg3, and sends the Msg4 to the second-type node, the second-type node successfully decodes the Msg4, and finds that the Msg4 is not intended to be sent to the second-type node S104 — Under the circumstance that the first condition is met, the second-type node resends random access signaling Msg1

FIG. 1

RANDOM ACCESS SIGNALLING RESENDING METHOD AND APPARATUS

TECHNICAL FIELD

The disclosure relates to the field of communications, and particularly to a method and device for resending random access signaling.

BACKGROUND

A Machine Type Communication (MTC) User Equipment (UE), also called as a Machine to Machine (M2M) user communication equipment, is a main application form of the present Internet of things. Low power consumption and low cost are important guarantees for its large-scale application. M2M equipment already deployed on the market is mainly based on a Global System of Mobile Communication (GSM). In recent years, due to improvement of spectral efficiency of Long Term Evolution (LTE)/LTE-Advanced (LTE-A), more and more mobile operating companies select LTE/LTE-A as an evolution direction of wideband wireless communication systems in the future. Various kinds of LTE/LTE-A-based M2M data services will be more attractive. An M2M service may be actually converted from a GSM to an LTE system only when cost of LTE-M2M equipment is lower than an MTC UE of the GSM.

In a related technology, main alternative methods for reducing cost of an MTC UE include: reducing a number of receiving antennae of the UE, reducing a baseband processing bandwidth of the UE, reducing a peak rate supported by the UE, adopting a half-duplex mode and the like. Cost reduction means performance reduction, however, a requirement on cell coverage of an LTE/LTE-A system is not allowed to be lowered. In this case, an MTC UE adopting a low-cost configuration may meet a coverage performance requirement of an existing LTE UE by adopting some measures. In addition, an MTC UE may be at a location such as a basement and a corner of a wall, and may be located in a scenario severer than an ordinary LTE UE. For compensating coverage reduction caused by penetration loss, part of MTC UEs requires performance to be improved more, so that it is necessary to perform uplink and downlink Coverage Enhancement (CE) on part of MTC UEs for such a scenario. How to ensure access quality of a user is the first problem to be considered, and it is necessary to perform enhanced design on random access signaling (also called as a Message 1 (Msg1)) of an LTE/LTE-A system to ensure that an MTC UE may normally access the system.

Location information of a Physical Resource Block (PRB) occupied by a Random Access Response (RAR) (also called as a Msg2) in an LTE/LTE-A system is included in Downlink Control Information (DCI) and sent through a Physical Downlink Control Channel (PDCCH). In addition, the DCI further includes a 16-bit Cyclic Redundancy Check (CRC), and the CRC is further scrambled by adopting a 16-bit Random Access Radio Network Temporary Identity (RA-RNTI), a scrambling manner being:

$$c_k = (b_k + a_k) \mod 2 \ k=0,1,\ldots,15,$$

where $b_k$ is a (k+1)th bit in the CRC, $a_k$ is a (k+1)th bit in the RA-RNTI and $c_k$ is a (k+1)th bit generated after scrambling.

A UE receives an RAR and obtains uplink time synchronization and an uplink resource, but may not be determine at this moment that the RAR is sent not to another UE but to the UE. This is because there exists such a probability that different UEs sends the same random access sequence on the same time-frequency resource and they may receive the same RAR through the same RA-RNTI. Moreover, the UE may also not know about whether there is another UE using the same resource for random access or not. Thus the UE needs to solve such a random access conflict by a subsequent Msg3 and Msg4.

The Msg3 is a first message transmitted on a Physical Uplink Shared Channel (PUSCH) by adopting a Hybrid Automatic Repeat Request (HARQ) mechanism on the basis of uplink scheduling. In an initial random access process, it is a Radio Resource Control (RRC) connection request message (RRCConnectionRequest) transmitted in the Msg3, and if different UEs receive the same RAR, they may obtain the same uplink resource and simultaneously send the Msgs3. For distinguishing different UEs, a UE-specific Identifier (ID) may be contained in the corresponding Msg3 to distinguish different UEs, and in the case of the initial access, this ID may be an S-Temporary Mobile Subscriber Identity (S-TMSI) (if existing) of the UE or a 40-bit value which is generated randomly.

The UE starts a competition elimination timer immediately after sending the Msg3 (this timer is required to be restarted every time when the Msg3 is retransmitted subsequently), and the UE needs to monitor a contention resolution message (ContentionResolution, Msg4) returned to it by an Evolved Node B (eNB) within the time of the timer.

If the UE receives the Msg4 returned by the eNB within the time configured by the competition elimination timer and a UE ID contained therein is consistent with that reported to the eNB by the UE in the Msg3, the UE considers that it wins in this random access conflict and succeeds in random access, and sets a temporary Cell Radio Network Temporary Identifier (C-RNTI) obtained in the RAR to be own C-RNTI. Otherwise, the UE considers that this access fails and re-executes a random access retransmission process.

For ensuring that an MTC UE may normally access a system, it is also necessary to perform enhanced design on a Msg1. Msg2, Msg3 and Msg4 of an LTE/LTE-A system to ensure that the MTC UE may normally access the system.

For the problem of low quality of access of a UE to an LTE % LTE-A system in the related technology, there is yet no effective solution.

SUMMARY

For that there is yet no effective solution for the problem of low quality of access of a UE to an LTE/LTE-A system in the related technology, the disclosure provides a method and device for resending random access signaling, so as at least to solve the problem.

According to an embodiment of the disclosure, a method for resending random access signaling is provided, which may include that: under the circumstance that a first condition is met, a second-type node resends random access signaling Msg1, wherein the first condition may include at least one of that: the second-type node fails to successfully decode an RAR Msg2: the second-type node successfully decodes the RAR Msg2, and there is no RAR information sent to the second-type node in the decoded RAR Msg2; a first-type node fails to successfully decode a Msg3: the first-type node successfully decodes the Msg3, and sends a Msg4 to the second-type node, and the second-type node fails to successfully decode the Msg4: and the first-type node successfully decodes the Msg3, and sends the Msg4 to the second-type node, the second-type node successfully decodes the Msg4, and finds that the Msg4 is not intended to be sent to the second-type node.

In the embodiment of the disclosure, when the first condition is that the second-type node fails to successfully decode the RAR Msg2 and the RAR Msg2 is a first-type RAR Msg2, the second-type node may resend the random access signaling Msg1 according to at least one of that:

a number of times for which the random access signaling Msg1 is repeatedly sent during a process of resending the random access signaling Msg1 is determined by level information of the second-type node;

a current level of the second-type node is a level i, and when a number of times for which the second-type node resends the random access signaling Msg1 at the level i is smaller than an upper limit Ni of a number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases sending power of resending the random access signaling Msg1, and sending time indication information for resending of the random access signaling Msg1 by the second-type node is K1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is K2:

when the second-type node is at the current level and the second-type node cannot increase the sending power of the random access signaling Msg1 any more, Ni=1; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts a number of times for which the random access signaling Msg1 is repeatedly sent and which is corresponding to a level next to the level i to resend the random access signaling Msg1, and the sending time indication information for resending of the random access signaling Msg1 by the second-type node is K0, wherein the sending time indication information for resending of the random access signaling Msg1 may refer to a time interval between resending of the random access signaling Msg1 and an ending moment of a detection window of a previous RAR Msg2; and the first-type RAR Msg2 may refer to RAR Msg2 including RAR information for the second-type nodes of the same levels.

In the embodiment of the disclosure, it may be included that: the K0, K1 and K2 meet the following condition: K0<=K1<=K2.

In the embodiment of the disclosure, it may be included that: the upper limit Ni of the number of times for which the random access signaling Msg1 is sent and which is corresponding to the level i is configured by the first-type node; and different levels correspond to different values of Ni.

In the embodiment of the disclosure, when the first condition is that the second-type node successfully decodes the RAR Msg2, but there is no RAR information sent to the second-type node and the RAR Msg2 is the first-type RAR Msg2, the second-type node may resend the random access signaling Msg1 according to at least one of that:

the number of times for which the random access signaling Msg1 is repeatedly sent during a process of resending the random access signaling Msg1 is determined by the level information of the second-type node;

when the level information of the second-type node does not change, the number of times for which the random access signaling Msg1 is repeatedly sent during a process of resending the random access signaling Msg1 is the same as a number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power of resending the random access signaling Msg1, and the sending time indication information for resending of the random access signaling Msg1 by the second-type node is M1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is M2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is M0, wherein the first-type RAR may refer to RAR only including the RAR information for the second-type nodes of the same levels; and the sending time indication information for resending of the random access signaling Msg1 may refer to the time interval between resending of the random access signaling and the ending moment of the detection window of the previous RAR Msg2.

In the embodiment of the disclosure, it may be included that: the M0, M1 and M2 meet the following condition:

$$M0<=M1<=M2.$$

In the embodiment of the disclosure, it may be included that: the upper limit Ni of the number of times for which the random access signaling Msg1 is sent and which is corresponding to the level i is configured by the first-type node; and different levels correspond to different values of Ni.

In the embodiment of the disclosure, it may be included that: the K0, K1, K2, M0, M1 and M2 meet at least one of the following conditions:

$$K0<=M0;$$

$$K1<=M1; \text{ and}$$

$$K2<=M2.$$

In the embodiment of the disclosure, when the first condition is that the second-type node fails to successfully decode the RAR Msg2, the second-type node only decodes an RAR Msg2 corresponding to the current level and the RAR Msg2 is a second-type RAR Msg2, the second-type node may resend the random access signaling Msg1 according to at least one of that:

the number of times for which the random access signaling Msg1 is repeatedly sent during a process of resending the random access signaling Msg1 is determined by the level information of the second-type node;

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power of resending the random access signaling Msg1, and the sending time indication information for resending of the random access signaling Msg1 by the second-type node is P(i)_1, i being a level index, for the level i;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is P(i)_2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is P(i)_0, wherein the second-type RAR Msg2 may refer to RAR Msg2 including RAR information for the second-type nodes of one or more levels; and the sending time indication information for resending of the random access signaling Msg1 may refer to the time interval between resending of the random access signaling Msg1 and the ending moment of the detection window of the previous RAR Msg2.

In the embodiment of the disclosure, it may be included that: P(i)_0, P(i)_1 and P(i)_2 meet the following condition:

$$P(i)\_0<=P(i)\_1<=P(i)\_2.$$

In the embodiment of the disclosure, it may be included that: the upper limit Ni of the number of times for which the random access signaling Msg1 is sent and which is corresponding to the level i is configured by the first-type node; and different levels correspond to different values of Ni.

In the embodiment of the disclosure, when the first condition is that the second-type node fails to successfully decode the RAR Msg2 corresponding to the level of the second-type node, the second-type node fails to successfully decode an RAR Msg2 higher than the level of the second-type node and the RAR Msg2 is the second-type RAR Msg2, the second-type node may resend the random access signaling Msg1 according to at least one of that:

the number of times for which the random access signaling Msg1 is repeatedly sent during a process of resending the random access signaling Msg1 is determined by information of a new level selected by the second-type node:

the new level is a level next to a highest level corresponding to an RAR Msg2 decoded by the second-type node:

index information of the highest level corresponding to the RAR Msg2 decoded by the second-type node is sent to the second-type node by the first-type node; and the second-type RAR Msg2 refers to RAR Msg2 including RAR information for the second-type nodes of one or more levels.

In the embodiment of the disclosure, when the first condition is that the second-type node fails to successfully decode the RAR Msg2 corresponding to the level of the second-type node, the second-type node successfully decodes the RAR Msg2 corresponding to a level higher than the level of the second-type node and the RAR Msg2 is the second-type RAR Msg2, the second-type node may resend the random access signaling Msg1 according to at least one of that:

the number of times for which the random access signaling Msg1 is repeatedly sent during a process of resending the random access signaling Msg1 is determined by the information of the new level selected by the second-type node, wherein the new level may be the level corresponding to the RAR Msg2 successfully decoded by the second-type node; and the second-type RAR Msg2 may refer to RAR Msg2 including RAR information for the second-type nodes of one or more levels.

In the embodiment of the disclosure, when the first condition is that the first-type node successfully decodes the Msg3 and sends the Msg4 to the second-type node and the second-type node fails to successfully decode the Msg4, the second-type node may resend the random access signaling Msg1 according to at least one of that:

the number of times for which the random access signaling Msg1 is repeatedly sent during a process of resending the random access signaling Msg1 is determined by the level information of the second-type node;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment of the disclosure, the second-type node may send at least one of the following information in the Msg3:

indication information indicating the first-type node to increase a number of times for which the Msg4 is repeatedly sent;

information indicating an increment by which the first-type node increases the number of times for which the Msg4 is repeatedly sent; and the number of times for which the Msg4 is repeatedly sent by the first-type node.

In the embodiment of the disclosure, it may be included that: the upper limit Ni of the number of times for which the random access signaling Msg1 is repeatedly sent and which is corresponding to a level next to the level i is configured by the first-type node; and different levels correspond to different values of Ni.

In the embodiment of the disclosure, when the first condition is that the first-type node successfully decodes the Msg3 and sends the Msg4 to the second-type node and the second-type node successfully decodes the Msg4 and finds that the Msg4 is not intended to be sent to the second-type node, the operation that the second-type node resends the random access signaling Msg1 may be required to be executed according to at least one of that:

the number of times for which the random access signaling Msg1 is repeatedly sent during a process of resending the random access signaling Msg1 is determined by the level information of the second-type node:

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment of the disclosure, it may be included that: the upper limit Ni of the number of times for which the random access signaling Msg1 is sent and which is corresponding to the level i is configured by the first-type node: and different levels correspond to different values of Ni.

In the embodiment of the disclosure, when the first condition is that the first-type node fails to successfully decode the Msg3, the second-type node may resend the random access signaling Msg1 according to at least one of that:

the number of times for which the random access signaling Msg1 is repeatedly sent during a process of resending the random access signaling Msg1 is determined by the level information of the second-type node; and the second-type node adopts the number of times for which the random access signaling Msg1 is repeatedly sent and which is corresponding to the level i to resend the Msg1, and if the first-type node still cannot successfully decode the Msg3, the second-type node adopts the number of times for which the random access signaling Msg1 is repeatedly sent and which is corresponding to a level next to the level i to resend the Msg1, wherein the current level of the second-type node may be the level i, and the upper limit of the number of sending times for which the second-type node resends the random access signaling Msg1 at the level i may be Ni.

In the embodiment of the disclosure, the level of the second-type node may include at least one of:
a CE Level (CEL);
a Physical Random Access Channel (PRACH) CEL; and
a PRACH repeated sending level.

In the embodiment of the disclosure, the first-type node may be at least one of:
a Macrocell, a Microcell, a Picocell, a Femtocell, a home eNB, a Low Power Node (LPN) and a relay,
wherein the second-type node may include at least one of: one or more Human to Human (H2H) communication terminals, one or more M2M communication terminals and one or more Device to Device (D2D) communication terminals.

According to another embodiment of the disclosure, a device for resending random access signaling is further provided, which may include:

a detection module, configured to detect whether a first condition is met or not, wherein the first condition may include at least one of that:

a second-type node fails to successfully decode an RAR Msg2;

the second-type node successfully decodes the RAR Msg2, and there is no RAR information sent to the second-type node in the decoded RAR Msg2;

a first-type node fails to successfully decode a Msg3;

the first-type node successfully decodes the Msg3, and sends a Msg4 to the second-type node, and the second-type node fails to successfully decode the Msg4;

the first-type node successfully decodes the Msg3, and sends the Msg4 to the second-type node, the second-type node successfully decodes the Msg4, and finds that the Msg4 is not intended to be sent to the second-type node; and a sending module, configured to, under the circumstance that the first condition is met, resend, by the second-type node, random access signaling Msg1.

In the embodiment of the disclosure, when the first condition is that the second-type node fails to successfully decode the RAR Msg2 and the RAR Msg2 is a first-type RAR Msg2, the sending module may resend the random access signaling Msg1 according to at least one of that:

a number of times for which the random access signaling Msg1 is repeatedly sent during a process of resending the random access signaling Msg1 is determined by level information of the second-type node;

when the level information of the second-type node does not change, the number of times for which the random access signaling Msg1 is repeatedly sent during a process of resending the random access signaling Msg1 is the same as a number of times for which the random access signaling Msg1 is repeatedly sent during last sending;

a current level of the second-type node is a level i, and when a number of times for which the second-type node resends the random access signaling Msg1 at the level i is smaller than an upper limit Ni of a number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases sending power for resending the random access signaling Msg1, and sending time indication information for resending of the random access signaling Msg1 by the second-type node is K1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is K2;

when the second-type node is at the current level and the second-type node cannot increase the sending power of the random access signaling Msg1 any more, Ni=1; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts a number of times for which the random access signaling Msg1 is repeatedly sent and which is corresponding to the level i to resend the random access signaling Msg1, and the sending time indication information for resending of the random access signaling Msg1 by the second-type node is K0, wherein the sending time indication information for resending of the random access signaling Msg1 may refer to a time interval between resending of the random access signaling Msg1 and an ending moment of a detection window of a previous RAR Msg2; and the first-type RAR Msg2 may refer to RAR Msg2 including RAR information for the second-type nodes of the same levels.

In the embodiment of the disclosure, it may be included that: K0, K1 and K2 meet the following condition:

$$K0<=K1<=K2.$$

In the embodiment of the disclosure, it may be included that: the upper limit Ni of the number of times for which the random access signaling Msg1 is sent and which is corresponding to the level i is configured by the first-type node; and different levels correspond to different values of Ni.

In the embodiment of the disclosure, when the first condition is that the second-type node successfully decodes the RAR Msg2, but there is no RAR information sent to the second-type node and the RAR Msg2 is the first-type RAR Msg2, the sending module may resend the random access signaling Msg1 according to at least one of that:

the number of times for which the random access signaling Msg1 is repeatedly sent during a process of resending the random access signaling Msg1 is determined by the level information of the second-type node;

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power for resending the random access signaling Msg1, and the sending time indication information for resending of the random access signaling Msg1 by the second-type node is M1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is M2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is M0, wherein the first-type RAR may refer to RAR only including the RAR information for the second-type nodes of the same levels: and the sending time indication information for resending of the random access signaling Msg1 may refer to the time interval between resending of the random access signaling Msg1 and the ending moment of the detection window of the previous RAR Msg2.

In the embodiment of the disclosure, it may be included that: M0, M1 and M2 meet the following condition:

$M0<=M1<=M2.$

In the embodiment of the disclosure, it may be included that: the upper limit Ni of the number of times for which the random access signaling Msg1 is sent and which is corresponding to the level i is configured by the first-type node: and different levels correspond to different values of Ni.

In the embodiment of the disclosure, it may be included that: K0, K1, K2, M0, M1 and M2 meet at least one of the following conditions:

$K0<=M0;$ $K1<=M1;$ and $K2<=M2.$

In the embodiment of the disclosure, when the first condition is that the second-type node fails to successfully decode the RAR Msg2, the second-type node only decodes an RAR Msg2 corresponding to the current level and the RAR Msg2 is a second-type RAR Msg2, the sending module may resend the random access signaling Msg1 according to at least one of that:

the number of times for which the random access signaling Msg1 is repeatedly sent during a process of resending the random access signaling Msg1 is determined by the level information of the second-type node;

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i1, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power for resending the random access signaling Msg1, and the sending time indication information for resending of the random access signaling Msg1 by the second-type node is P(i)_1, i being a level index, for the level i;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is P(i)_2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is P(i)_0, wherein the second-type RAR Msg2 may refer to RAR Msg2 only including RAR information for the second-type nodes of one or more levels; and the sending time indication information for resending of the random access signaling Msg1 may refer to the time interval between resending of the random access signaling Msg1 and the ending moment of the detection window of the previous RAR Msg2.

In the embodiment of the disclosure, it may be included that: P(i)_0, P(i)_1 and P(i)_2 meet the following condition:

$P(i)\_0<=P(i)\_1<=P(i)\_2.$

In the embodiment of the disclosure, it may be included that: the upper limit Ni of the number of times for which the random access signaling Msg1 is sent and which is corresponding to the level i is configured by the first-type node; and different levels correspond to different values of Ni.

In the embodiment of the disclosure, when the first condition is that the second-type node fails to successfully decode the RAR Msg2 corresponding to the level of the second-type node, the second-type node fails to successfully decode an RAR Msg2 corresponding to a level higher than the level of the second-type node and the RAR Msg2 is the second-type RAR Msg2, the sending module may resend the random access signaling Msg1 according to at least one of that:

the number of times for which the random access signaling Msg1 is repeatedly sent during a process of resending the random access signaling Msg1 is determined by information of a new level selected by the second-type node;

the new level is a level next to a highest level corresponding to the RAR Msg2 decoded by the second-type node;

index information of the highest level corresponding to the RAR Msg2 decoded by the second-type node is sent to the second-type node by the first-type node; and the second-type RAR Msg2 refers to RAR Msg2 only including RAR information for the second-type nodes of one or more levels.

In the embodiment of the disclosure, when the first condition is that the second-type node fails to successfully decode the RAR Msg2 corresponding to the level of the second-type node, the second-type node successfully decodes the RAR Msg2 corresponding to the level higher than the level of the second-type node and the RAR Msg2 is the second-type RAR Msg2, the sending module may resend the random access signaling Msg1 according to at least one of that:

the number of times for which the random access signaling Msg1 is repeatedly sent during a process of resending the random access signaling Msg1 is determined by the information of the new level selected by the second-type node, wherein the new level may be a level corresponding to the RAR Msg2 successfully decoded by the second-type node; and the second-type RAR Msg2 may refer to RAR Msg2 only including RAR information for the second-type nodes of one or more levels.

In the embodiment of the disclosure, when the first condition is that the first-type node successfully decodes the Msg3 and sends the Msg4 to the second-type node and the second-type node fails to successfully decode the Msg4, the sending module may resend the random access signaling Msg1 according to at least one of that:

the number of times for which the random access signaling Msg1 is repeatedly sent during a process of resending the random access signaling Msg1 is determined by the level information of the second-type node:

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment of the disclosure, the second-type node may send at least one of the following information in the Msg3:

indication information indicating the first-type node to increase a number of times for which the Msg4 is repeatedly sent;

information indicating an increment by which the first-type node increases the number of times for which the Msg4 is repeatedly sent; and the number of times for which the Msg4 is repeatedly sent by the first-type node.

In the embodiment of the disclosure, it may be included that: the upper limit Ni of the number of times for which the random access signaling Msg1 is sent and which is corresponding to the level i is configured by the first-type node; and different levels correspond to different values of Ni.

In the embodiment of the disclosure, when the first condition is that the first-type node successfully decodes the Msg3 and sends the Msg4 to the second-type node and the second-type node successfully decodes the Msg4 which is not intended to be sent to the second-type node, the operation that the sending module resends the random access signaling Msg1 may be required to be executed according to at least one of that:

the number of times for which the random access signaling Msg1 is repeatedly sent during a process of resending the random access signaling Msg1 is determined by the level information of the second-type node;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment of the disclosure, it may be included that: the upper limit Ni of the number of times for which the random access signaling Msg1 is sent and which is corresponding to the level i is configured by the first-type node: and different levels correspond to different values of Ni.

In the embodiment of the disclosure, when the first condition is that the first-type node fails to successfully decode the Msg3, the sending module may resend the random access signaling Msg1 according to at least one of that:

the number of times for which the random access signaling Msg1 is repeatedly sent during a process of resending the random access signaling Msg1 is determined by the level information of the second-type node: and the second-type node adopts the number of times for which the random access signaling Msg1 is repeatedly sent and which is corresponding to the level i to resend the Msg1, and if the first-type node still cannot successfully decode the Msg3, the second-type node adopts the number of times for which the random access signaling Msg1 is repeatedly sent and which is corresponding to a level next to the level i to resend the Msg1, wherein the current level of the second-type node may be the level i, and the upper limit of the number of sending times for which the second-type node resends the random access signaling Msg1 at the level i may be Ni.

In the embodiment of the disclosure, the level of the second-type node may include at least one of:

a CEL;

a PRACH CEL; and a PRACH repeated sending level.

In the embodiment of the disclosure, the first-type node may be at least one of:

a Macrocell, a Microcell, a Picocell, a Femtocell, a home eNB, an LPN and a relay, wherein the second-type node may include at least one of: one or more H2H communication terminals, one or more M2M communication terminals and one or more D2D communication terminals.

According to the disclosure, under the circumstance that the first condition is met, the second-type node resends the random access signaling Msg1, wherein the first condition includes at least one of that: the second-type node fails to successfully decode the RAR Msg2: the second-type node successfully decodes the RAR Msg2, and there is no RAR information sent to the second-type node in the decoded RAR Msg2; the first-type node fails to successfully decode the Msg3: the first-type node successfully decodes the Msg3, and sends the Msg4 to the second-type node, and the second-type node fails to successfully decode the Msg4; and the first-type node successfully decodes the Msg3, and sends the Msg4 to the second-type node, the second-type node successfully decodes the Msg4, and finds that the Msg4 is not intended to be sent to the second-type node. The problem of low quality of access of a UE to an LTE/LTE-A system is solved, and the quality of access of the UE to the LTE/LTE-A system is improved.

BRIEF DESCRIPTION OF DRAWINGS

The drawings described here are adopted to provide a further understanding to the disclosure, which form a part of the disclosure. Schematic embodiments of the disclosure and descriptions thereof are adopted to explain the disclosure and not intended to form improper limits to the disclosure. In the drawings:

FIG. 1 is a flowchart of a method for resending random access signaling according to an embodiment of the disclosure.

DETAILED DESCRIPTION

Figure 2:
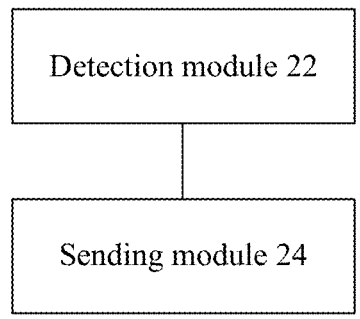
FIG. 2 is a structure block diagram of a device for resending random access signaling according to an embodiment of the disclosure.
Figure 3:
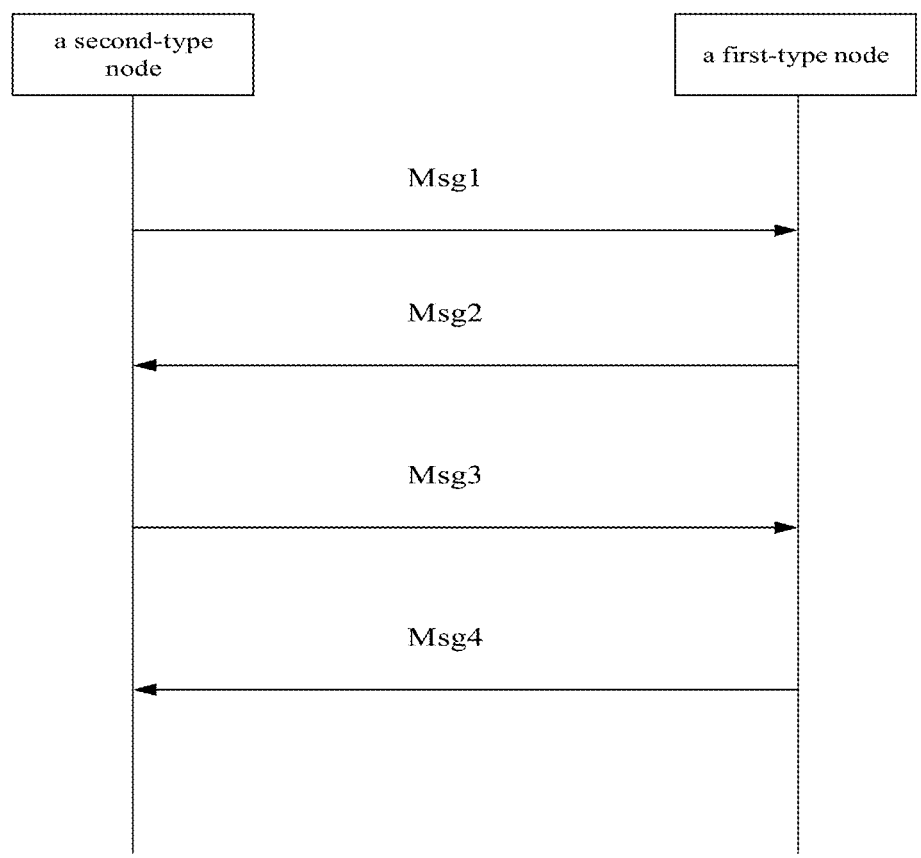
FIG. 3 is a block diagram showing messages passing between nodes.

The disclosure will be described below in detail with reference to the drawings and in combination with embodiments. It is to be noted that the embodiments in the disclosure and characteristics in the embodiments may be combined without conflicts.

It is to be noted that terms "first", "second" and the like in the specification, claims and drawings of the disclosure are adopted not to describe a specific sequence or order but to distinguish similar objects.

An embodiment provides a method for resending random access signaling. FIG. 1 is a flowchart of a method for resending random access signaling according to an embodiment of the disclosure. As shown in FIG. 1, the flow includes the following steps.

In Step S102, whether a first condition is met or not is detected, the first condition including at least one of that: a second-type node fails to successfully decode an RAR Msg2; the second-type node successfully decodes the RAR Msg2, and there is no RAR information sent to the second-type node in the decoded RAR Msg2; a first-type node fails to successfully decode a Msg3: the first-type node successfully decodes the Msg3, and sends a Msg4 to the second-type node, and the second-type node fails to successfully decode the Msg4; and the first-type node successfully decodes the Msg3, and sends the Msg4 to the second-type node, the second-type node successfully decodes the Msg4, and finds that the Msg4 is not intended to be sent to the second-type node.

In Step S104, under the circumstance that the first condition is met, the second-type node resends random access signaling Msg1.

By the above steps, enhanced design is performed on a Msg1, Msg2, Msg3 and Msg4 for access of a UE to an LTE/LTE-A system, it is ensured that an MTC UE may normally access the system, the problem of low quality of access of the UE to the LTE/LTE-A system is solved, and the quality of access of the UE to the LTE/LTE-A system is improved.

In the embodiment, when the first condition is that the second-type node fails to successfully decode the RAR Msg2 and the RAR Msg2 is a first-type RAR Msg2, the second-type node resends the random access signaling Msg1 according to at least one of that:

a number of times for which the random access signaling Msg1 is repeatedly sent during a process of resending the random access signaling Msg1 is determined by level information of the second-type node:

when the level information of the second-type node does not change, the number of times for which the random access signaling Msg1 is repeatedly sent during a process of resending the random access signaling Msg1 is the same as a number of times for which the random access signaling Msg1 is repeatedly sent during last sending;

a current level of the second-type node is a level i, and when a number of times for which the second-type node resends the random access signaling Msg1 at the level i is smaller than an upper limit Ni of a number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases sending power for resending the random access signaling Msg1, and sending time indication information for resending of the random access signaling Msg1 by the second-type node is K1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is K2:

when the second-type node is at the current level and the second-type node cannot increase the sending power of the random access signaling Msg1 any more, Ni=1; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts a number of times for which the random access signaling Msg1 is repeatedly sent and which is corresponding to a level next to the level i to resend the random access signaling Msg1, and the sending time indication information for resending of the random access signaling Msg1 by the second-type node is K0, wherein the sending time indication information for resending of the random access signaling Msg1 refers to a time interval between resending of the random access signaling Msg1 and an ending moment of a detection window of a previous RAR Msg2; and the first-type RAR Msg2 refers to RAR Msg2 including RAR information for the second-type nodes of the same levels.

In the embodiment, K0, K1 and K2 meet the following condition:

$K0<=K1<=K2.$

In the embodiment, the upper limit Ni of the number of times for which the random access signaling Msg1 is sent and which is corresponding to the level i is configured by the first-type node; and different levels correspond to different values of Ni.

In the embodiment, when the first condition is that the second-type node successfully decodes the RAR Msg2, but there is no RAR information sent to the second-type node and the RAR Msg2 is the first-type RAR Msg2, the second-type node resends the random access signaling Msg1 according to at least one of that:

the number of times for which the random access signaling Msg1 is repeatedly sent during a process of resending the random access signaling Msg1 is determined by the level information of the second-type node:

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power for resending the random access signaling Msg1, and the sending time indication information for resending of the random access signaling Msg1 by the second-type node is M1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is M2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is M0, wherein the first-type RAR refers to RAR only including the RAR information for the second-type nodes of the same levels; and the sending time indication information for resending of the random access signaling Msg1 refers to the time interval between resending of the random access signaling and the ending moment of the detection window of the previous RAR Msg2.

In the embodiment, M0, M1 and M2 meet the following condition:

$M0<=M1<=M2.$

In the embodiment, the upper limit Ni of the number of times for which the random access signaling Msg1 is sent and which is corresponding to the level i is configured by the first-type node; and different levels correspond to different values of Ni.

In the embodiment, K0, K1, K2, M0, M1 and M2 meet at least one of the following conditions:

$K0<=M0;$ $K1<=M1;$ and $K2<=M2.$

In the embodiment, when the first condition is that the second-type node fails to successfully decode the RAR Msg2, the second-type node only decodes an RAR Msg2 corresponding to the current level and the RAR Msg2 is a second-type RAR Msg2, the second-type node resends the random access signaling Msg1 according to at least one of that:

the number of times for which the random access signaling Msg1 is repeatedly sent during a process of resending the random access signaling Msg1 is determined by the level information of the second-type node:

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power of resending the random access signaling Msg1, and the sending time indication information for resending of the random access signaling Msg1 by the second-type node is P(i)_1, i being a level index, for the level i;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is P(i)_2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i1, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is P(i)_0, wherein the second-type RAR Msg2 refers to RAR Msg2 only including RAR information for the second-type nodes of one or more levels; and the sending time indication information for resending of the random access signaling Msg1 refers to the time interval between resending of the random access signaling Msg1 and the ending moment of the detection window of the previous RAR Msg2.

In the embodiment, $P(i)\_0$, $P(i)\_1$ and $P(i)\_2$ meet the following condition:

$$P(i)\_0 <= P(i)\_1 <= P(i)\_2.$$

In the embodiment, the upper limit Ni of the number of times for which the random access signaling Msg1 is sent and which is corresponding to the level i is configured by the first-type node; and different levels correspond to different values of Ni.

In the embodiment, when the first condition is that the second-type node fails to successfully decode the RAR Msg2 corresponding to the level of the second-type node, the second-type node fails to successfully decode an RAR Msg2 corresponding to a level higher than the level of the second-type node and the RAR Msg2 is the second-type RAR Msg2, the second-type node resends the random access signaling Msg1 according to at least one of that:

the number of times for which the random access signaling Msg1 is repeatedly sent during a process of resending the random access signaling Msg1 is determined by information of a new level selected by the second-type node;

the new level is a level next to a highest level corresponding to an RAR Msg2 decoded by the second-type node;

index information of the highest level corresponding to the RAR Msg2 decoded by the second-type node is sent to the second-type node by the first-type node; and the second-type RAR Msg2 refers to RAR Msg2 only including RAR information for the second-type nodes of one or more levels.

In the embodiment, when the first condition is that the second-type node fails to successfully decode the RAR Msg2 corresponding to the level of the second-type node, the second-type node successfully decodes the RAR Msg2 corresponding to the level higher than the level of the second-type node and the RAR Msg2 is the second-type RAR Msg2, the second-type node resends the random access signaling Msg1 according to at least one of that:

the number of times for which the random access signaling Msg1 is repeatedly sent during a process of resending the random access signaling Msg1 is determined by the information of the new level selected by the second-type node, wherein the new level is a level corresponding to the RAR Msg2 successfully decoded by the second-type node; and the second-type RAR Msg2 refers to RAR Msg2 only including RAR information for the second-type nodes of one or more levels.

In the embodiment, when the first condition is that the first-type node successfully decodes the Msg3 and sends the Msg4 to the second-type node and the second-type node fails to successfully decode the Msg4, the second-type node resends the random access signaling Msg1 according to at least one of that:

the number of times for which the random access signaling Msg1 is repeatedly sent during a process of resending the random access signaling Msg1 is determined by the level information of the second-type node:

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment, the second-type node sends at least one of the following information via the Msg3:

indication information indicating the first-type node to increase a number of times for which the Msg4 is repeatedly sent;

information indicating an increment by which the first-type node increases the number of times for which the Msg4 is repeatedly sent; and the number of times for which the Msg4 is repeatedly sent by the first-type node.

In the embodiment, the upper limit Ni of the number of times for which the random access signaling Msg1 is sent and which is corresponding to the level i is configured by the first-type node; and different levels correspond to different values of Ni.

In the embodiment, when the first condition is that the first-type node successfully decodes the Msg3 and sends the Msg4 to the second-type node and the second-type node successfully decodes the Msg4 which is not intended to be sent to the second-type node, the operation that the second-type node resends the random access signaling Msg1 is required to be executed according to at least one of that:

the number of times for which the random access signaling Msg1 is repeatedly sent during a process of resending the random access signaling Msg1 is determined by the level information of the second-type node;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment, the upper limit Ni of the number of times for which the random access signaling Msg1 is sent and which is corresponding to the level i is configured by the first-type node; and different levels correspond to different values of Ni.

In the embodiment, when the first condition is that the first-type node fails to successfully decode the Msg3, the second-type node resends the random access signaling Msg1 according to at least one of that:

the number of times for which the random access signaling Msg1 is repeatedly sent during a process of resending the random access signaling Msg1 is determined by the level information of the second-type node; and the second-type node adopts the number of times for which the random access signaling Msg1 is repeatedly sent and which is corresponding to the level i to resend the Msg1, and if the first-type node still cannot successfully decode the Msg3, the second-type node adopts the number of times for which the random access signaling Msg1 is repeatedly sent and which is corresponding to a level next to the level i to resend the Msg1, wherein the current level of the second-type node is the level i, and the upper limit of the number of sending times for which the second-type node resends the random access signaling Msg1 at the level i is Ni.

In the embodiment, the level of the second-type node includes at least one of:

a CEL;

a Physical Random Access Channel (PRACH) CEL; and a PRACH repeated sending level.

In the embodiment, the first-type node is at least one of:

a Macrocell, a Microcell, a Picocell, a Femtocell, a home eNB, an LPN and a relay, wherein the second-type node includes at least one of: one or more H2H communication terminals, one or more M2M communication terminals and one or more D2D communication terminals.

FIG. 2 is a structure block diagram of a device for resending random access signaling according to an embodiment of the disclosure. As shown in FIG. 2, the device includes:

a detection module 22, configured to detect whether a first condition is met or not, wherein the first condition includes at least one of that:

a second-type node fails to successfully decode an RAR Msg2;

the second-type node successfully decodes the RAR Msg2, and there is no RAR information sent to the second-type node in the decoded RAR Msg2;

a first-type node fails to successfully decode a Msg3;

the first-type node successfully decodes the Msg3, and sends a Msg4 to the second-type node, and the second-type node fails to successfully decode the Msg4;

the first-type node successfully decodes the Msg3, and sends the Msg4 to the second-type node, the second-type node successfully decodes the Msg4, and finds that the Msg4 is not intended to be sent to the second-type node; and a sending module 24, configured to, under the circumstance that the first condition is met, resend, by the second-type node, random access signaling Msg1.

By the device, enhanced design is performed on a Msg1, Msg2, Msg3 and Msg4 for access of a UE to an LTE/LTE-A system, it is ensured that an MTC UE may normally access the system, the problem of low quality of access of the UE to the LTE/LTE-A system is solved, and the quality of access of the UE to the LTE/LTE-A system is improved.

In the embodiment, when the first condition is that the second-type node fails to successfully decode the RAR Msg2 and the RAR Msg2 is a first-type RAR Msg2, the sending module 24 resends the random access signaling Msg1 according to at least one of that:

a number of times for which the random access signaling Msg1 is repeatedly sent during a process of resending the random access signaling Msg1 is determined by level information of the second-type node;

when the level information of the second-type node does not change, the number of times for which the random access signaling Msg1 is repeatedly sent during a process of resending the random access signaling Msg1 is the same as a number of times for which the random access signaling Msg1 is repeatedly sent during last sending;

a current level of the second-type node is a level i, and when a number of times for which the second-type node resends the random access signaling Msg1 at the level i is smaller than an upper limit Ni of a number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases sending power for resending the random access signaling Msg1, and sending time indication information for resending of the random access signaling Msg1 by the second-type node is K1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is K2;

when the second-type node is at the current level and the second-type node cannot increase the sending power of the random access signaling Msg1 any more, Ni=1; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts a number of times for which the random access signaling Msg1 is repeatedly sent and which is corresponding to the level i to resend the random access signaling Msg1, and the sending time indication information for resending of the random access signaling Msg1 by the second-type node is K0, wherein the sending time indication information for resending of the random access signaling Msg1 refers to a time interval between resending of the random access signaling Msg1 and an ending moment of a detection window of a previous RAR Msg2; and the first-type RAR Msg2 refers to RAR Msg2 including RAR information for the second-type nodes of the same levels.

In the embodiment, K0, K1 and K2 meet the following condition:

$$K0<=K1<=K2.$$

In the embodiment, the upper limit Ni of the number of times for which the random access signaling Msg1 is sent and which is corresponding to the level i is configured by the first-type node; and different levels correspond to different values of Ni.

In the embodiment, when the first condition is that the second-type node successfully decodes the RAR Msg2, but there is no RAR information sent to the second-type node and the RAR Msg2 is the first-type RAR Msg2, the sending module 24 resends the random access signaling Msg1 according to at least one of that:

the number of times for which the random access signaling Msg1 is repeatedly sent during a process of resending the random access signaling Msg1 is determined by the level information of the second-type node;

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power for resending the random access signaling Msg1, and the sending time indication information for resending of the random access signaling Msg1 by the second-type node is M1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is M2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is M0, wherein the first-type RAR refers to RAR only including the RAR information for the second-type nodes of the same levels; and the sending time indication information for resending of the random access signaling Msg1 refers to the time interval between resending of the random access signaling and the ending moment of the detection window of the previous RAR Msg2.

In the embodiment, M0, M1 and M2 meet the following condition:

$$M0<=M1<=M2.$$

In the embodiment, the upper limit Ni of the number of times for which the random access signaling Msg1 is sent and which is corresponding to the level i is configured by the first-type node: and different levels correspond to different values of Ni.

In the embodiment, K0, K1, K2, M0, M1 and M2 meet at least one of the following conditions:

$$K0<=M0;$$

$$K1<=M1; \text{ and}$$

$$K2<=M2.$$

In the embodiment, when the first condition is that the second-type node fails to successfully decode the RAR Msg2, the second-type node only decodes an RAR Msg2 corresponding to the current level and the RAR Msg2 is a second-type RAR Msg2, the sending module 24 resends the random access signaling Msg1 according to at least one of that:

the number of times for which the random access signaling Msg1 is repeatedly sent during a process of resending the random access signaling Msg1 is determined by the level information of the second-type node;

when the level information of the second-type node does not change, the number of times for which the random access signaling Msg1 is repeatedly sent during a process of resending the random access signaling Msg1 is the same as the number of times for which the random access signaling Msg1 is repeatedly sent during last sending:

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1, the second-type node increases the sending power for resending the random access signaling Msg1, and the sending time indication information for resending of the random access signaling Msg1 by the second-type node is P(i)_1, i being a level index, for the level i;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, and the sending time indication information for resending of the random access signaling Msg1 by the second-type node is P(i)_2; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts the number of times for which the random access signaling Msg1 is repeatedly sent and which is corresponding to a level next to the level i to resend the random access signaling Msg1, and the sending time indication information for resending of the random access signaling Msg1 by the second-type node is P(i)_0, wherein the second-type RAR Msg2 refers to RAR Msg2 only including RAR information for the second-type nodes of one or more levels; and the sending time indication information for resending of the random access signaling Msg1 refers to the time interval between resending of the random access signaling Msg1 and the ending moment of the detection window of the previous RAR Msg2.

In the embodiment, P(i)_0, P(i)_1 and P(i)_2 meet the following condition:

$$P(i)\_0<=P(i)\_1<=P(i)\_2.$$

In the embodiment, the upper limit Ni of the number of times for which the random access signaling Msg1 is sent and which is corresponding to the level i is configured by the first-type node; and different levels correspond to different values of Ni.

In the embodiment, when the first condition is that the second-type node fails to successfully decode the RAR Msg2 corresponding to the level of the second-type node, the second-type node fails to successfully decode an RAR Msg2 corresponding to a level higher than the level of the second-type node and the RAR Msg2 is the second-type RAR Msg2, the sending module 24 resends the random access signaling Msg1 according to at least one of that:

the number of times for which the random access signaling Msg1 is repeatedly sent during a process of resending the random access signaling Msg1 is determined by information of a new level selected by the second-type node:

the new level is a level next to a highest level corresponding to an RAR Msg2 decoded by the second-type node:

index information of the highest level corresponding to the RAR Msg2 decoded by the second-type node is sent to the second-type node by the first-type node; and the second-type RAR Msg2 refers to RAR Msg2 only including RAR information for the second-type nodes of one or more levels.

In the embodiment, when the first condition is that the second-type node fails to successfully decode the RAR Msg2 corresponding to the level of the second-type node, the second-type node successfully decodes the RAR Msg2 corresponding to the level higher than the level of the second-type node and the RAR Msg2 is the second-type RAR Msg2, the sending module 24 resends the random access signaling Msg1 according to at least one of that:

the number of times for which the random access signaling Msg1 is repeatedly sent during a process of resending the random access signaling Msg1 is determined by the information of the new level selected by the second-type node, wherein the new level is a level corresponding to the RAR Msg2 successfully decoded by the second-type node; and the second-type RAR Msg2 refers to RAR Msg2 only including RAR information for the second-type nodes of one or more levels.

In the embodiment, when the first condition is that the first-type node successfully decodes the Msg3 and sends the Msg4 to the second-type node and the second-type node fails to successfully decode the Msg4, the sending module 24 resends the random access signaling Msg1 according to at least one of that:

the number of times for which the random access signaling Msg1 is repeatedly sent during a process of resending the random access signaling Msg1 is determined by the level information of the second-type node;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment, the second-type node sends at least one of the following information via the Msg3:

indication information indicating the first-type node to increase a number of times for which the Msg4 is repeatedly sent;

information indicating an increment by which the first-type node increases the number of times for which the Msg4 is repeatedly sent; and the number of times for which the Msg4 is repeatedly sent by the first-type node.

In the embodiment, the upper limit Ni of the number of times for which the random access signaling Msg1 is sent and which is corresponding to the level i is configured by the first-type node; and different levels correspond to different values of Ni.

In the embodiment, when the first condition is that the first-type node successfully decodes the Msg3 and sends the Msg4 to the second-type node and the second-type node successfully decodes the Msg4 which is not intended to be sent to the second-type node, the operation that the sending module 24 resends the random access signaling Msg1 is required to be executed according to at least one of that:

the number of times for which the random access signaling Msg1 is repeatedly sent during a process of resending the random access signaling Msg1 is determined by the level information of the second-type node;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node can increase the sending power of the random access signaling Msg1, the sending power of the random access signaling is not increased; and the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node adopts the number of times for which the random access signaling Msg1 is repeatedly sent and which is corresponding to a level next to the level i to resend the random access signaling Msg1.

In the embodiment, the upper limit Ni of the number of times for which the random access signaling Msg1 is sent and which is corresponding to the level i is configured by the first-type node; and different levels correspond to different values of Ni.

In the embodiment, when the first condition is that the first-type node fails to successfully decode the Msg3, the sending module 24 resends the random access signaling Msg1 according to at least one of that:

the number of times for which the random access signaling Msg1 is repeatedly sent during a process of resending the random access signaling Msg1 is determined by the level information of the second-type node; and the second-type node adopts the number of times for which the random access signaling Msg1 is repeatedly sent and which is corresponding to the level i to resend the Msg1, and if the first-type node still cannot successfully decode the Msg3, the second-type node adopts the number of times for which the random access signaling Msg1 is repeatedly sent and which is corresponding to a level next to the level i to resend the Msg1, wherein the current level of the second-type node may be the level i, and the upper limit of the number of sending times for which the second-type node resends the random access signaling Msg1 at the level i may be Ni.

In the embodiment, the level of the second-type node includes at least one of:

a CEL;

a PRACH CEL; and a PRACH repeated sending level.

In the embodiment, the first-type node is at least one of:

a Macrocell, a Microcell, a Picocell, a Femtocell, a home eNB, an LPN and a relay, wherein the second-type node includes at least one of: one or more H2H communication terminals, one or more M2M communication terminals and one or more D2D communication terminals.

The disclosure will be described below in detail in combination with preferred embodiments and implementation modes.

First Embodiment

There exist a plurality of MTC UEs in an LTE system and the plurality of MTC UEs may support CE. In the embodiment, a Msg1 supports totally three CELs, i.e. a CEL0, a CEL1 and a CEL2, and a UE1 and a UE2 are MTC UEs of the CEL0. An eNB allocates PRACH resources to the MTC UEs of each CEL, including preambles used for sending random access signaling and subframes and PRBs used for sending the preambles. Different CELs correspond to different number of times for which the Msg1 is repeatedly sent, and the UE1 and the UE2 send the random access signaling (Msgs1) on a PRACH of the CEL0 according to configuration information of the eNB.

The eNB sends a Msg2 to respond to the Msgs1 of the CEL0, but the Msg2 only includes RAR information for the UE2. The Msg1 sent by the UE1 is not successfully detected by the eNB, so that the eNB may not send RAR information for the UE1 in the Msg2.

In the embodiment, the UE1 fails to successfully decode the Msg2, and the UE1 resends the random access signaling according to at least one of that:

a number of times for which the random access signaling is repeatedly sent during a process of resending the random access signaling is determined by the CEL information of the UE1;

when the CEL of the UE1 does not change, the number of times for which the random access signaling is repeatedly sent during a process of resending the random access signaling is the same as a number of times for which the random access signaling is repeatedly sent during last sending;

when the CEL of the UE1 is the CEL0, and when the number of times for which the UE1 resends the random access signaling is smaller than an upper limit of a number of times for which the random access signaling is sent and which is corresponding to the CEL0 and the UE1 may further increase sending power of the random access signaling, the UE1 continues adopting the number of times for which the random access signaling is repeatedly sent and which is corresponding to the CEL0 to resend the random access signaling, and increases the sending power of the random access signaling, and sending time indication information for resending of the random access signaling is K1;

when the CEL of the UE1 is the CEL0, and when the number of times for which the UE1 resends the random access signaling is smaller than the upper limit of the number of times for which the random access signaling is sent and which is corresponding to the CEL0 and the UE1 cannot increase the sending power of the random access signaling any more, the UE1 continues adopting the number of times for which the random access signaling is repeatedly sent and which is corresponding to the CEL0 to resend the random access signaling, and the sending time indication information for resending of the random access signaling is K2; and when the CEL of the UE1 is the CEL0 and the number of times for which the UE1 resends the random access signaling is greater than or equal to the upper limit of the number of times for which the random access signaling is sent and which is corresponding to the CEL0, the UE1 adopts a number of times for which the random access signaling is repeatedly sent and which is corresponding to the CEL1 to resend the random access signaling, and the sending time indication information for resending of the random access signaling is K0, wherein the sending time indication information for resending of the random access signaling refers to a time interval between resending of the random access signaling and an ending moment of a detection window of a previous RAR, wherein K0<=K1<=K2.

Second Embodiment

There exist a plurality of MTC UEs in an LTE system and the plurality of MTC UEs may support CE. In the embodiment, a Msg1 supports totally three CELs, i.e. a CEL0, a CEL1 and a CEL2, and a UE1, a UE2 and a UE3 are MTC UEs of the CEL0. An eNB allocates PRACH resources to the MTC UEs of each CEL, including preambles used for sending random access signaling and subframes and PRBs used for sending the preambles. Different CELs correspond to different number of times for which the Msg1 is repeatedly sent, and the UE1, the UE2 and the UE3 send the random access signaling (Msgs1) on a PRACH of the CEL0 according to configuration information of the eNB.

The eNB sends a Msg2 to respond to the Msgs1 of the CEL0, but the Msg2 only includes RAR information for the UE2.

In the embodiment, the UE1 fails to successfully decode the Msg2, and the UE1 resends the random access signaling according to at least one of that:

a number of times for which the random access signaling is repeatedly sent during a process of resending the random access signaling is determined by the CEL information of the UE1;

when a CEL of the UE1 does not change, the number of times for which the random access signaling is repeatedly sent during a process of resending the random access signaling is the same as a number of times for which the random access signaling is repeatedly sent during last sending;

when the CEL of the UE1 is the CEL0, and when the number of times for which the UE1 resends the random access signaling is smaller than an upper limit of a number of times for which the random access signaling is sent and which is corresponding to the CEL0 and the UE1 may further increase sending power of the random access signaling, the UE continues adopting the number of times for which the random access signaling is repeatedly sent and which is corresponding to the CEL0 to resend the random access signaling, and increases the sending power of the random access signaling, and sending time indication information for resending of the random access signaling is K1;

when the CEL of the UE1 is the CEL0, and when the number of times for which the UE1 resends the random access signaling is smaller than the upper limit of the number of times for which the random access signaling is sent and which is corresponding to the CEL0 and the UE1 cannot increase the sending power of the random access signaling any more, the UE1 continues adopting the number of times for which the random access signaling is repeatedly sent and which is corresponding to the CEL0 to resend the random access signaling, and the sending time indication information for resending of the random access signaling is K2; and when the CEL of the UE1 is the CEL0 and the number of times for which the UE1 resends the random access signaling is greater than or equal to the upper limit of the number of times for which the random access signaling is sent and which is corresponding to the CEL0, the UE1 adopts a number of times for which the random access signaling is repeatedly sent and which is corresponding to the CEL1 to resend the random access signaling, and the sending time indication information for resending of the random access signaling is K0, wherein the sending time indication information for resending of the random access signaling refers to a time interval between resending of the random access signaling and an ending moment of a detection window of a previous RAR, wherein K0<=K1<=K2.

In the embodiment, although the UE3 successfully decodes the Msg2, there is no RAR information sent to it in the Msg2, and the UE3 resends the random access signaling according to at least one of that:

a number of times for which the random access signaling is repeatedly sent during a process of resending the random access signaling is determined by CEL information of the UE3;

when a CEL of the UE3 does not change, the number of times for which the random access signaling is repeatedly sent during a process of resending the random access signaling is the same as a number of times for which the random access signaling is repeatedly sent during last sending;

when the CEL of the UE3 is the CEL0, and when the number of times for which the UE3 resends the random access signaling is smaller than the upper limit of the number of times for which the random access signaling is sent and which is corresponding to the CEL0 and the UE3 may further increase sending power of the random access signaling, the UE3 continues adopting the number of times for which the random access signaling is repeatedly sent and which is corresponding to the CEL0 to resend the random access signaling, and increases the sending power of the random access signaling, and sending time indication information for resending of the random access signaling is M1;

when the CEL of the UE3 is the CEL0, the number of times for which the UE3 resends the random access signaling is smaller than the upper limit of the number of times for which the random access signaling is sent and which is corresponding to the CEL0 and the UE3 cannot increase the sending power of the random access signaling any more, the UE3 continues adopting the number of times for which the random access signaling is repeatedly sent and which is corresponding to the CEL0 to resend the random access signaling, and the sending time indication information for resending of the random access signaling is M2; and when the CEL of the UE3 is the CEL0 and the number of times for which the UE3 resends the random access signaling is greater than or equal to the upper limit of the number of times for which the random access signaling is sent and which is corresponding to the CEL0, the UE3 adopts the number of times for which the random access signaling is repeatedly sent and which is corresponding to the CEL1 to resend the random access signaling, and the sending time indication information for resending of the random access signaling is M0, wherein the sending time indication information for resending of the random access signaling refers to a time interval between resending of the random access signaling and an ending moment of a detection window of a previous RAR, wherein M0<=M1<=M2, wherein K0, K1, K2, M0, M1 and M2 meet at least one of that:

$K0<=M0;$ $K1<=M1;$ and $K2<=M2.$

Third Embodiment

There exist a plurality of MTC UEs in an LTE system and the plurality of MTC UEs may support CE. In the embodiment, a Msg1 supports totally three CELs, i.e. a CEL0, a CEL1 and a CEL2, a UE1, a UE2 and a UE3 are MTC UEs of the CEL0, and a UE4 is an MTC UE of the CEL1. An eNB allocates PRACH resources to the MTC UEs of each CEL, including preambles used for sending random access signaling and subframes and PRBs used for sending the preambles. Different CELs correspond to different number of times for which the Msg1 is repeatedly sent, the UE1, the UE2 and the UE3 send the random access signaling (Msgs1) on a PRACH of the CEL0 according to configuration information of the eNB, and the UE4 sends the random access signaling (Msg1) on a PRACH of the CEL1 according to the configuration information of the eNB.

The eNB sends a Msg2 to respond to the Msgs1 of the CEL0 and the CEL1, the Msg2 includes RAR information for the UE3 and the UE4, and the Msg2 is sent according to a number of times for which the sending is repeatedly performed and which is corresponding to the CEL1.

In the embodiment, the UE1 only tries to decode the Msg2 sent for a number of times for which the sending is repeatedly performed and which is corresponding to the CEL0, but the UE1 fails to successfully decode the Msg2, and the UE1 resends the random access signaling according to at least one of that:

a number of times for which the random access signaling is repeatedly sent during a process of resending the random access signaling is determined by CEL information of the UE1;

when a CEL of the UE1 does not change, the number of times for which the random access signaling is repeatedly sent during a process of resending the random access signaling is the same as a number of times for which the random access signaling is repeatedly sent during last sending;

when the CEL of the UE1 is the CEL0, and when the number of times for which the UE1 resends the random access signaling is smaller than an upper limit of a number of times for which the random access signaling is sent and which is corresponding to the CEL0 and the UE1 may further increase sending power of the random access signaling, the UE1 continues adopting the number of times for which the random access signaling is repeatedly sent and which is corresponding to the CEL0 to resend the random access signaling, and increases the sending power of the random access signaling, and sending time indication information for resending of the random access signaling is K1;

when the CEL of the UE1 is the CEL0, and when the number of times for which the UE1 resends the random access signaling is smaller than the upper limit of the number of times for which the random access signaling is sent and which is corresponding to the CEL0 and the UE1 cannot increase the sending power of the random access signaling any more, the UE1 continues adopting the number of times for which the random access signaling is repeatedly sent and which is corresponding to the CEL0 to resend the random access signaling, and the sending time indication information for resending of the random access signaling is K2; and when the CEL of the UE1 is the CEL0 and the number of times for which the UE1 resends the random access signaling is greater than or equal to the upper limit of the number of times for which the random access signaling is sent and which is corresponding to the CEL0, the UE1 adopts the number of times for which the random access signaling is repeatedly sent and which is corresponding to the CEL1 to resend the random access signaling, and the sending time indication information for resending of the random access signaling is K0, wherein the sending time indication information for resending of the random access signaling refers to a time interval between resending of the random access signaling and an ending moment of a detection window of a previous RAR, wherein K0<=K1<=K2.

In the embodiment, the UE2 tries to decode the Msg2 sent for the numbers of repeated sending times corresponding to the CEL0 and the CEL1, and successfully decodes the Msg2 at the CEL1, but there is no RAR information sent to it in the Msg2, and the UE2 resends the random access signaling according to at least one of that:

a number of times for which the random access signaling is repeatedly sent during a process of resending the random access signaling by the UE2 is determined by the CEL1.

In the embodiment, the UE3 tries to decode the Msg2 sent for the numbers of repeated sending times corresponding to the CEL0 and the CEL1, fails to successfully decode the Msg2 at the CEL0, but successfully decodes the Msg2 at the CEL1, the Msg2 includes RAR information sent to it, and the UE3 sends at least one of the following information in a Msg3:

information indicating the eNB to send a Msg4 according to the CEL1;

information indicating an increment of a number of times for which the Msg4 is repeatedly sent by the eNB relative to the number of times corresponding to the CEL0; and information indicating the number of times for which the Msg4 is repeatedly sent by the eNB.

Fourth Embodiment

There exist a plurality of MTC UEs in an LTE system and the plurality of MTC UEs may support CE. In the embodiment, a Msg1 supports totally three CELs, i.e. a CEL0, a CEL1 and a CEL2, a UE1 is an MTC UE of the CEL0, and a UE2 is an MTC UE of the CEL1. An eNB allocates PRACH resources to the MTC UEs of each CEL, including preambles used for sending random access signaling and subframes and PRBs used for sending the preambles. Different CELs correspond to different number of times for which the Msg1 is repeatedly sent, the UE1 sends the random access signaling (Msgs1) on a PRACH of the CEL0 according to configuration information of the eNB, and the UE2 sends the random access signaling (Msg1) on a PRACH of the CEL1 according to the configuration information of the eNB.

The eNB sends a Msg2 to respond to the Msgs1 sent by the UE1 and the UE2, both the UE1 and the UE2 correctly decodes RAR information sent to them, and the UE1 and the UE2 send Msgs3 to the eNB respectively.

In the embodiment, the eNB successfully decodes the Msg3 sent by the UE1 and sends a Msg4 to the UE1, but the UE1 fails to successfully decode the Msg4, and the UE1 resends the random access signaling according to at least one of that:

a number of times for which the random access signaling is repeatedly sent during a process of resending the random access signaling is determined by CEL information of the UE1;

when the number of times for which the UE1 resends the random access signaling is smaller than an upper limit of a number of times for which the random access signaling is sent and which is corresponding to the CEL0 and the UE1 may further increase sending power of the random access signaling, the UE1 does not increase the sending power of the random access signaling; and when the number of times for which the UE1 resends the random access signaling is greater than or equal to the upper limit of the number of times for which the random access signaling is sent and which is corresponding to the CEL0, the UE1 adopts the number of times for which the random access signaling is repeatedly sent and which is corresponding to the CEL0 to resend the random access signaling, and the UE1 sends at least one of the following information in a Msg3:

indication information indicating the eNB to increase a number of times for which the Msg4 is repeatedly sent;

information indicating an increment by which the eNB increases the number of times for which the Msg4 is repeatedly sent; and information indicating the number of times for which the Msg4 is repeatedly sent by the eNB.

In the embodiment, the eNB successfully decodes the Msg3 sent by the UE2 and sends the Msg4 to the UE2, the UE2 successfully decodes the Msg4, but finds that the Msg4 is not intended to be sent to itself, and the UE2 resends the random access signaling according to at least one of that:

a number of times for which the random access signaling is repeatedly sent during a process of resending the random access signaling is determined by the CEL information of the UE2;

when the number of times for which the UE2 resends the random access signaling is smaller than an upper limit of the number of times for which the random access signaling is sent and which is corresponding to the CEL and the UE2 may further increase sending power of the random access signaling, the UE2 does not increase the sending power of the random access signaling; and when the number of times for which the UE2 resends the random access signaling is greater than or equal to the upper limit of the number of times for which the random access signaling is sent and which is corresponding to the CEL1, the UE2 adopts the number of times for which the random access signaling is sent and which is corresponding to the CEL2 to resend the random access signaling.

From the above descriptions about the implementation modes, those skilled in the art may clearly learn about that the method according to the embodiment may be implemented in a manner of combining software and a necessary universal hardware platform, and of course, may also be implemented through hardware. However, under many circumstances, the former is a better implementation mode. Based on such an understanding, the technical solutions of the disclosure substantially or parts making contributions to a conventional art may be embodied in form of software product, and the computer software product is stored in a storage medium (such as a Read-Only Memory (ROM)/Random Access Memory (RAM), a magnetic disk and an optical disk, including a plurality of instructions configured to enable a terminal equipment (which may be a mobile phone, a computer, a server, a network equipment or the like) to execute the method of each embodiment of the disclosure.

In the embodiment, the storage medium may include, but not limited to: various media capable of storing program codes such as a U disk, a ROM, a RAM, a mobile hard disk, a magnetic disk or an optical disk.

Obviously, those skilled in the art should know that each module or each step of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

Based on the technical solutions provided by the embodiments of the disclosure, under the circumstance that the first condition is met, the second-type node resends the random access signaling Msg1, wherein the first condition includes at least one of that: the second-type node fails to successfully decode the RAR Msg2; the second-type node successfully decodes the RAR Msg2, and there is no RAR information sent to the second-type node in the decoded RAR Msg2; the first-type node fails to successfully decode the Msg3; the first-type node successfully decodes the Msg3, and sends the Msg4 to the second-type node, and the second-type node fails to successfully decode the Msg4; and the first-type node successfully decodes the Msg3, and sends the Msg4 to the second-type node, the second-type node successfully decodes the Msg4, but finds that the Msg4 is not intended to be sent to the second-type node. The problem of low quality of access of a UE to an LTE/LTE-A system is solved, and the quality of access of the UE to the LTE/LTE-A system is improved.

The invention claimed is:

1. A method for resending random access signaling, comprising:
under the circumstance that a first condition is met, resending, by a second-type node, random access signaling Message 1 (Msg1), wherein the first condition comprises at least one of that:
the second-type node fails to successfully decode a Random Access Response (RAR) Msg2;
the second-type node successfully decodes the RAR Msg2, and there is no RAR information, which is intended to be sent to the second-type node, in the decoded RAR Msg2;
a first-type node fails to successfully decode a Msg3;
the first-type node successfully decodes the Msg3, and sends a Msg4 to the second-type node, and the second-type node fails to successfully decode the Msg4; or
the first-type node successfully decodes the Msg3, and sends the Msg4 to the second-type node, the second-type node successfully decodes the Msg4 and finds that the Msg4 is not intended to be sent to the second-type node, wherein when the first condition is that the second-type node fails to successfully decode the RAR Msg2 and the RAR Msg2 is a first-type RAR Msg2, the second-type node resends the random access signaling Msg1 in at least one of the following manners;
a number of times for which the random access signaling Msg1 is repeatedly sent during a process of resending the random access signaling Msg1 is determined by level information of the second-type node;
when the level information of the second-type node does not change, the number of times for which the random access signaling Msg1 is repeatedly sent during a process of resending the random access signaling Msg1 is the same as a number of times for which the random access signaling Msg1 is repeatedly sent during last sending;
a current level of the second-type node is a level i, and when a number of times for which the second-type node resends the random access signaling Msg1 at the level i is smaller than an upper limit Ni of a number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1; the second-type node increases sending power for resending the random access signaling Msg1; or sending time indication information for resending of the random access signaling Msg1 by the second-type node is K1;
the current level of the second-type node is the level i, and when the number of times for which the second-type node resends the random access signaling Msg1 at the level i is smaller than the upper limit Ni of the a number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1, or the sending time indication information for resending of the random access signaling Msg1 by the second-type node is K2;
when the second-type node is at the current level and the second-type node cannot increase the sending power of the random access signaling Msg1 any more, Ni=1: or
the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts a number of times for which the random access signaling Msg1 is repeatedly sent and which is corresponding to a level next to the level i to resend the random access signaling Msg1, or the sending time indication information for resending of the random access signaling Msg1 by the second-type node is K0, wherein the sending time indication information for resending of the random access signaling Msg1 refers to a time interval between resending of the random access signaling Msg1 and an ending moment of a detection window of a previous RAR Msg2, and each of K0, K1 and K2 is greater than 0; i is an integer; and Ni is a positive integer; and the first-type RAR Msg2 refers to RAR Msg2 comprising RAR information for the second-type nodes of the same levels.

2. The method as claimed in claim 1, wherein the upper limit Ni of the number of times for which the random access signaling Msg1 is sent and which is corresponding to the level i is configured by the first-type node; and different levels correspond to different values of Ni.

3. The method as claimed in claim 1, wherein the level of the second-type node comprises at least one of:
a Coverage Enhancement Level (CEL);
a Physical Random Access Channel (PRACH) CEL; and
a PRACH repeated sending level.

4. The method as claimed in claim 1, wherein the first-type node is at least one of:
a Macrocell, a Microcell, a Picocell, a Femtocell, a home Evolved Node B (eNB), a Low Power Node (LPN) and a relay,
wherein the second-type node comprises at least one of: one or more Human to Human (H2H) communication terminals, one or more Machine to Machine (M2M) communication terminals and one or more Device to Device (D2D) communication terminals.

5. A method for resending random access signaling, comprising:
under the circumstance that a first condition is met, resending, by a second-type node, random access signaling Message 1 (Msg1), wherein the first condition comprises at least one of that:
the second-type node fails to successfully decode a Random Access Response (RAR) Msg2;
the second-type node successfully decodes the RAR Msg2, and there is no RAR information, which is intended to be sent to the second-type node, in the decoded RAR Msg2;
a first-type node fails to successfully decode a Msg3;
the first-type node successfully decodes the Msg3, and sends a Msg4 to the second-type node, and the second-type node fails to successfully decode the Msg4, or
the first-type node successfully decodes the Msg3, and sends the Msg4 to the second-type node, the second-type node successfully decodes the Msg4 and finds that the Msg4 is not intended to be sent to the second-type node,
wherein when the first condition is that the second-type node fails to successfully decode the RAR Msg2 corresponding to the level of the second-type node, the second-type node fails to successfully decode an RAR Msg2 corresponding to a level higher than the level of the second-type node and the RAR Msg2 is a second-type RAR Msg2, the second-type node resends the random access signaling Msg1 in at least one of the following manners:
the number of times for which the random access signaling is repeatedly sent during a process of resending the random access signaling is determined by information of a new level selected by the second-type node;
the new level is a level next to a highest level corresponding to an RAR Msg2 decoded by the second-type node;

index information of the highest level corresponding to the RAR Msg2 decoded by the second-type node is sent to the second-type node by the first-type node; or
the second-type RAR Msg2 refers to RAR Msg2 comprising RAR information for the second-type nodes of one or more levels.

6. The method as claimed in claim 5, wherein the level of the second-type node comprises at least one of:
a Coverage Enhancement Level (CEL);
a Physical Random Access Channel (PRACH) CEL; and
a PRACH repeated sending level.

7. The method as claimed in claim 5, wherein the first-type node is at least one of:
a Macrocell, a Microcell, a Picocell, a Femtocell, a home Evolved Node B (eNB), a Low Power Node (LPN) and a relay,
wherein the second-type node comprises at least one of: one or more Human to Human (H2H) communication terminals, one or more Machine to Machine (M2M) communication terminals and one or more Device to Device (D2D) communication terminals.

8. A device for resending random access signaling, comprising:
a processor; and
a memory configured to store instructions executable by the processor,
wherein the processor is configured to:
detect whether a first condition is met or not, wherein the first condition comprises at least one of that:
a second-type node fails to successfully decode a Random Access Response (RAR) Message 2 (Msg2);
the second-type node successfully decodes the RAR Msg2, and there is no RAR information, which is intended to be sent to the second-type node, in the decoded RAR Msg2;
a first-type node fails to successfully decode a Msg3;
the first-type node successfully decodes the Msg3, and sends a Msg4 to the second-type node, and the second-type node fails to successfully decode the Msg4;
the first-type node successfully decodes the Msg3, and sends the Msg4 to the second-type node, the second-type node successfully decodes the Msg4, and finds that the Msg4 is not intended to be sent to the second-type node; or
under the circumstance that the first condition is met, resend, by the second-type node, random access signaling Msg1,
wherein when the first condition is that the second-type node fails to successfully decode the RAR Msg2 and the RAR Msg2 is a first-type RAR Msg2, the processor is configured to resend the random access signaling Msg1 in at least one of the following manners:
a number of times for which the random access signaling Msg1 is repeatedly sent during a process of resending the random access signaling Msg1 is determined by level information of the second-type node;
when the level information of the second-type node does not change, the number of times for which the random access signaling Msg1 is repeatedly sent during a process of resending the random access signaling Msg1 is the same as a number of times for which the random access signaling Msg1 is repeatedly sent during last sending;
a current level of the second-type node is a level i, and when a number of times for which the second-type node resends the random access signaling Msg1 at the level i is smaller than an upper limit Ni of a number of times for which the random access signaling Msg1 is sent and which is corresponding to the level i, the second-type node resends the random access signaling Msg1 in at least one of the following manners: the second-type node continues adopting the number of times for which the random access signaling Msg1 is repeatedly sent and which is corresponding to the level i to resend the random access signaling Msg1; the second-type node increases sending power for resending the random access signaling Msg1; or sending time indication information for resending of the random access signaling Msg1 by the second-type node is K1;

the current level of the second-type node is the level i, and when the number of times for which the second-type node resends the random access signaling Msg1 at the level i is smaller than the upper limit Ni of the number of times for which the random access signaling Msg1 is sent and which is corresponding to the level i and the second-type node cannot increase the sending power of the random access signaling Msg1 any more, the second-type node resends the random access signaling Msg1 in at least one of the following manners: the second-type node continues adopting the number of times for which the random access signaling Msg1 is repeatedly sent and which is corresponding to the level i to resend the random access signaling Msg1; or the sending time indication information for resending of the random access signaling Msg1 by the second-type node is K2;

when the second-type node is at the current level and the second-type node cannot increase the sending power of the random access signaling Msg1 any more, Ni=1; or the current level of the second-type node is the level i, and when the number of times for which the second-type node resends the random access signaling Msg1 at the level i is greater than or equal to the upper limit Ni of the number of times for which the random access signaling Msg1 is sent and which is corresponding to the level i, the second-type node resends the random access signaling Msg1 in at least one of the following manners: the second-type node adopts a number of times for which the random access signaling Msg1 is repeatedly sent and which is corresponding to a level next to the level i to resend the random access signaling Msg1, or the sending time indication information for resending of the random access signaling Msg1 by the second-type node is K0, wherein the sending time indication information for resending of the random access signaling Msg1 refers to a time interval between resending of the random access signaling Msg1 and an ending moment of a detection window of a previous RAR Msg2, i is an integer, and i is a positive integer; and the first-type RAR Msg2 refers to RAR Msg2 comprising RAR information for the second-type nodes of the same levels.

9. The device as claimed in claim 8, wherein the upper limit i of the number of times for which the random access signaling Msg1 is sent and which is corresponding to the level i is configured by the first-type node; and different levels correspond to different values of Ni.

* * * * *